(No Model.)
C. FLIEDNER.
ANIMAL TRAP.
No. 542,730. Patented July 16, 1895.
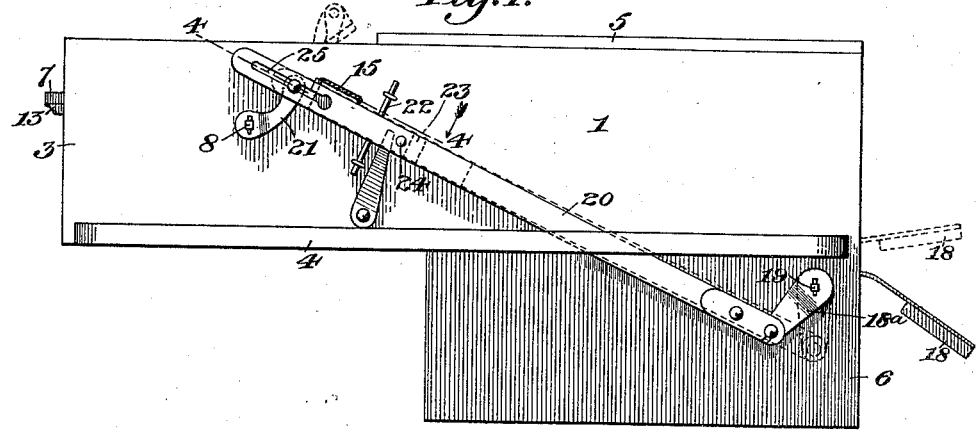
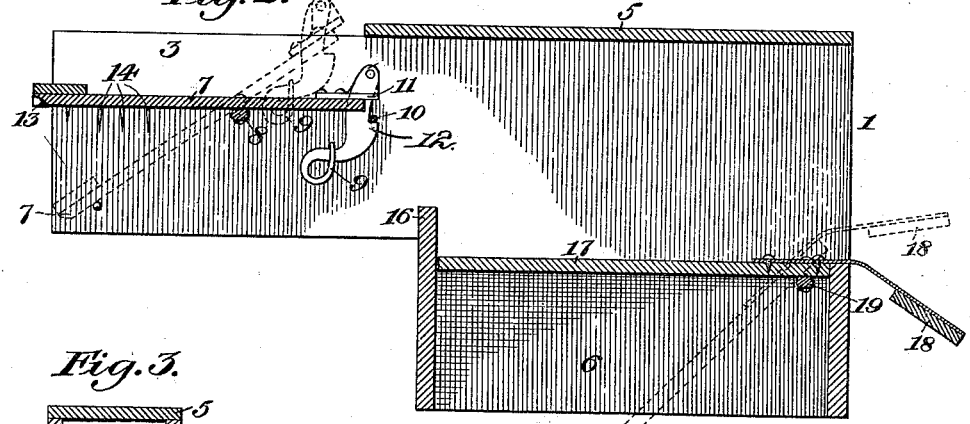
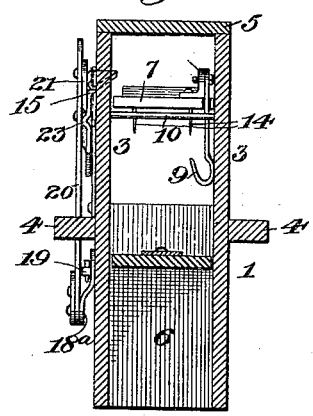
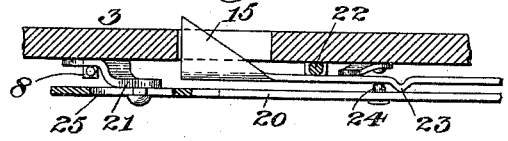
Witnesses
C. W. Smith
W. F. Riley
Inventor
Christopher Fliedner
By his Attorneys,
C. A. Snow & Co.

UNITED STATES PATENT OFFICE.

CHRISTOPHER FLIEDNER, OF PORTLAND, OREGON.

ANIMAL-TRAP.

SPECIFICATION forming part of Letters Patent No. 542,730, dated July 16, 1895.

Application filed April 30, 1895. Serial No. 547,683. (No model.)

*To all whom it may concern:*

Be it known that I, CHRISTOPHER FLIEDNER, a citizen of the United States, residing at Portland, in the county of Multnomah and State of Oregon, have invented a new and useful Animal-Trap, of which the following is a specification.

The invention relates to improvements in animal-traps.

The object of the present invention is to improve the construction of animal-traps of the self-set and ever-set class, and to provide one which will be simple and inexpensive in its construction, and which will be positive and rapid in its operation, in order to prevent a captured animal from leaving any trace of its presence sufficient to deter others from entering the trap.

The invention consists in the construction and novel combination and arrangement of parts hereinafter fully described, illustrated in the accompanying drawings, and pointed out in the claims hereto appended.

In the drawings, Figure 1 is a side elevation of an animal-trap constructed in accordance with this invention. Fig. 2 is a central longitudinal sectional view of the same, the parts being shown set in full lines and sprung in dotted lines. Fig. 3 is a transverse sectional view. Fig. 4 is a detail sectional view on line 4 4 of Fig 1.

Like numerals of reference indicate corresponding parts in all the figures of the drawings.

1 designates a casing comprising parallel sides 3, provided at their lower edges with laterally-disposed longitudinal flanges 4 and having the lower edges of its front portions resting upon a suitable supporting-surface, a top 5 secured to the upper edges of the rear portion of the sides 3, and a chute 6 depending from the rear portions of the sides 3. The front portions of the sides 3 have pivoted between them a trap-door 7 arranged in a horizontal position when the trap is set, and located below the upper edges of the sides and fixed to a transverse shaft or pintle 8.

The trap-door 7, when the trap is set, forms the top wall of the front portion of the trap, and the transverse pintle or shaft 8 is located beyond the center of the trap-door, and the front end of the latter is weighted, whereby the trap-door will assume an inclined position, as illustrated in dotted lines of Fig. 2 of the accompanying drawings, as soon as a bait-hook 9 is disengaged from a transverse rod 10 by reason of an animal tampering with and drawing slightly upon a suitable bait.

The bait-hook is preferably located adjacent to one of the sides 3 of the casing, in order not to interfere with the passage of an animal, and it is pivoted at its upper end to a perforated projection or lug of a plate 11 of the trap-door 7, and is located in a slot thereof. It is provided with a beveled projection or lug 12 for engaging the transverse rod 10, and its lower bait-receiving portion is extended or bent in the direction of the entrance, whereby the lug or projection 12 is held in position for automatically engaging the rod 10.

The front end of the trap-door 7 is hollowed out at 13 to accommodate the tail of a rat or similar animal and to prevent the same from interfering with the closing of the trap-door, and the latter is provided on the inner face of its front portion with a series of spurs 14, adapted to prick an animal and to force the same to proceed farther into the trap.

As soon as the trap-door assumes an inclined position by reason of the bait-receptacle—which may be of any desired form to accommodate various kinds of baits—being disengaged from the rod 10, it is locked in an inclined position by a pivoted spring-actuated latch 15. When an imprisoned animal finds itself suddenly confined it attempts generally to back out of the trap, and with much suddenness or quickness of movement, and this is generally sufficient to drive the spurs or points 14 rather deep into the rear portion of the animal, which by this time becomes frightened and is compelled to advance. The forward progress of the animal into the trap is slightly impeded by a transverse projection 16 of the chute 6. The animal will clear this at a bound and will land upon a hinged lower trap-door 17, arranged at the mouth of the chute or well 6, and adapted to cause the animal to drop into the same and to be received within a suitable cage or receptacle. (Not shown.)

The lower trap-door 17 is hinged at its rear end to the casing, and is provided with a counterbalancing-weight 18, which is overcome readily by the weight of an animal, and also by the momentum acquired by jumping over the projections 16 of the casing.

Any form of receptacle or cage may be provided to imprison the captured animals, and the trap may be employed for rats, rabbits, or any other similar animal, as will be readily understood.

A crank-arm 18$^a$ is connected with the bottom or lower trap-door 17 by being secured to the pintle or shaft 19 which hinges the lower trap-door, and the crank-arm 18$^a$ is connected by a rod 20 with a similar crank-arm 21, extending upward from the shaft or pintle 8 of the upper trap-door 7, whereby when the lower trap-door is operated it will, through the connecting rod or bar 20, actuate the crank-arm 21 and return the upper trap-door to its normal horizontal position. The catch or latch 15 consists of a plate arranged flat against the outer face of one side of the casing and pivoted thereto by a pintle 22 and provided at one end with a beveled lug extending through a slot of the casing and arranged to engage the upper trap-door to retain the same in its inclined position. The latch 15 is provided below its pivotal point with an outward bend forming an oppositely-beveled projection or lug 23. The reciprocating connecting-bar 20 is provided with a projection 24, arranged to engage the oppositely-beveled lug 23 to depress the adjacent portion of the latch to withdraw the lug out of engagement with the upper trap-door 7, and the upper end of the bar 20, which is disposed at an inclination similar to the latch, is provided with a longitudinal slot 25 to permit a limited independent movement of the bar 20 sufficient to disengage the latch 15 before actuating the upper trap-door 7. When the lower trap-door is depressed the inclined bar 20 is carried downward and first engages the beveled lug 23 and releases the upper trap-door 7 from the latch 15, and it then partially swings the crank-arm 21 downward and returns the upper trap-door to its normal horizontal position. This action is automatic, and the trap is set by each captured animal dropping through the chute 6, which forms an opening at the rear portion of the casing.

The supporting-surface upon which the laterally-disposed longitudinal flanges 4 are secured forms the bottom of the front portion of the casing, and an animal having a clear, unobstructed view through the casing is not aware that it is confined until the upper trap-door 7 assumes an inclined position. The operation of the trap is then so rapid, the animal being forced to advance, as before explained, that no trace of the presence of an animal remains sufficient to deter other animals of the same species from entering the trap.

It will be seen that the trap is exceedingly simple and inexpensive in construction, that it is positive and reliable in operation, and that it is capable of automatically resetting itself after each capture.

Changes in the form, proportion, and the minor details of construction may be resorted to without departing from the principle or sacrificing any of the advantages of this invention.

What I claim is—

1. A trap, comprising a casing forming a longitudinal passage and open at the ends thereof, and having at the rear portion of the passage an opening or chute, a horizontally disposed lower trap door arranged at the opening or chute and provided with a counterbalancing weight holding it normally in a horizontal position, an upper pivoted trap door located at the front of the casing and provided at its front end with a weight for depressing it to close the mouth of the trap, a bait holding device connected with the inner end of the upper trap door and holding the latter normally in a horizontal position, and adapted to be released by an animal, a catch or latch mounted on the casing and arranged to engage the upper trap door for locking the same in its inclined position, and connections between the upper and lower trap doors for releasing the catch or latch and for returning the upper trap door to its horizontal position, substantially as described.

2. A trap, comprising a casing having at its inner portion a chute or opening, a lower horizontally disposed trap door hinged to the casing and provided with a counterbalancing weight and arranged normally in a horizontal position at the opening or chute, an upper pivoted trap door normally arranged in a horizontal position and located at the front portion of the casing, and adapted to tilt to close the opening of the casing, a latch for locking the upper trap door in its inclined position, a transverse projection arranged in the casing and located in advance of the lower trap door, and connections between the upper and lower trap doors for releasing the latch, and for resetting the upper trap door, substantially as described.

3. A trap, comprising a casing, a lower trap door pivoted at the bottom of the casing and designed to communicate with a cage or the like, an upper pivoted trap door arranged at the front of the casing and adapted to tilt to close the entrance of the trap, crank arms connected with the upper and lower trap doors, a pivoted latch arranged to engage the upper trap door to lock the same in its inclined position, and a connecting bar pivoted to the crank arm of the lower trap door, and having a limited movement independent of the other crank arm and arranged to engage the latch to release the upper trap door, substantially as described.

4. A trap, comprising a casing, a lower trap door, an upper trap door located at the front of the casing and pivotally mounted therein, crank arms connected with the upper and lower trap doors, a latch pivotally mounted on the exterior of the casing and provided with a beveled lug extending through the casing for engaging and locking the upper trap door, said latch being provided with an outwardly extending lug, and a connecting bar pivoted to the crank arm of the lower trap door and having a limited movement independent of the other crank arm, and provided with a projection for engaging the outwardly extending lug of the latch, substantially as described.

In testimony that I claim the foregoing as my own I have hereto affixed my signature in the presence of two witnesses.

CHRISTOPHER FLIEDNER.

Witnesses:
MARGAREET SIEBOLD,
EDWARD BUKOWSKY.